Aug. 18, 1931.  A. E. SPINASSE  1,819,392
MEANS FOR AND METHOD OF DRAWING GLASS SHEETS OR PLATES
Filed Oct. 1, 1921  2 Sheets-Sheet 1
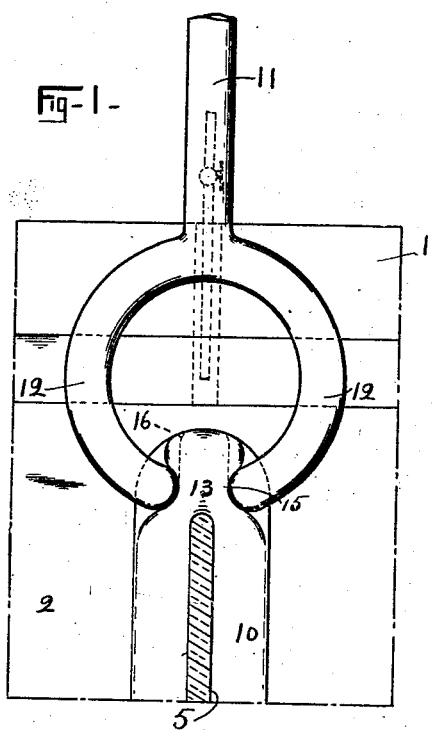
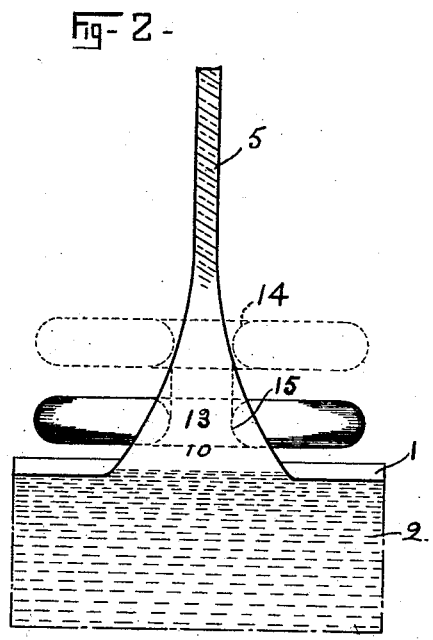
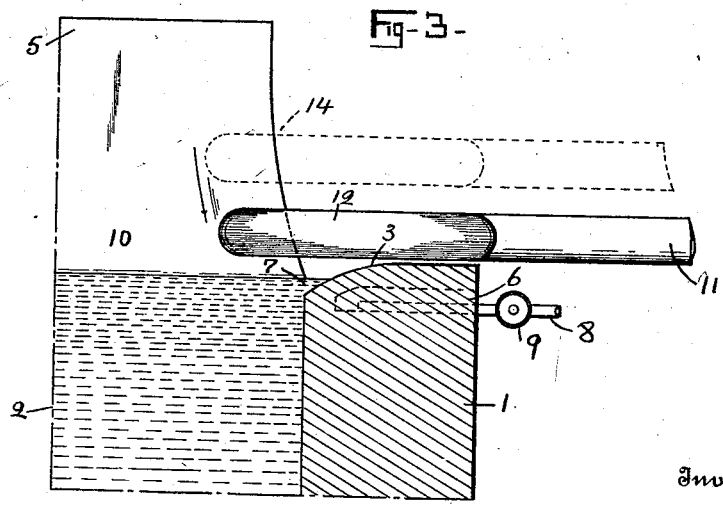
Inventor
Arthur E. Spinasse Aug. 18, 1931. A. E. SPINASSE 1,819,392
MEANS FOR AND METHOD OF DRAWING GLASS SHEETS OR PLATES
Filed Oct. 1, 1921 2 Sheets-Sheet 2
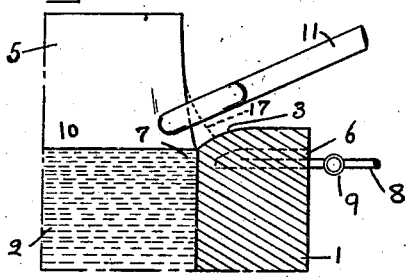
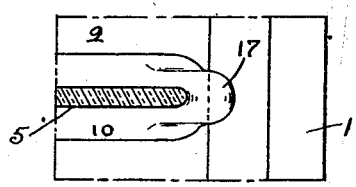
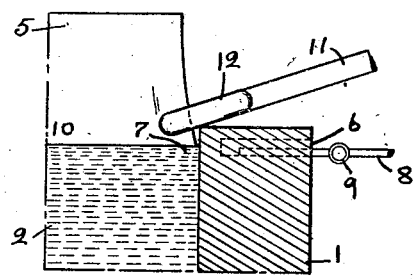
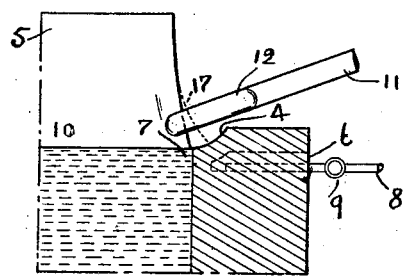
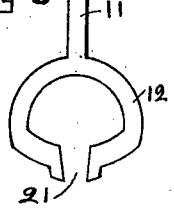
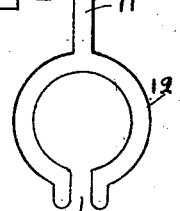
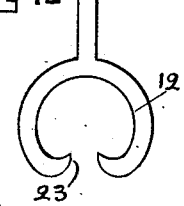
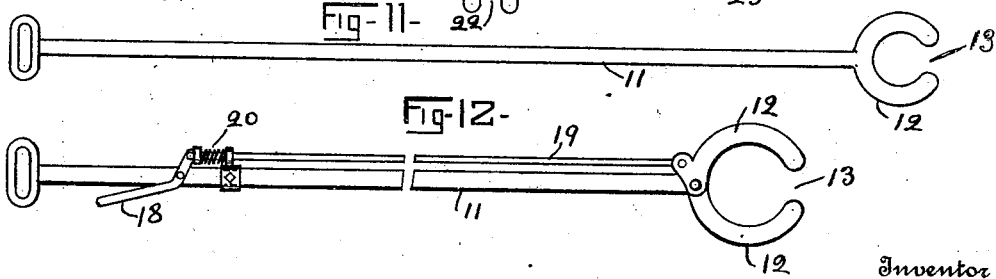
Inventor
Arthur E. Spinasse.

Patented Aug. 18, 1931

1,819,392

UNITED STATES PATENT OFFICE

ARTHUR E. SPINASSE, OF MOUNT VERNON, OHIO

MEANS FOR AND METHOD OF DRAWING GLASS SHEETS OR PLATES

Application filed October 1, 1921. Serial No. 504,652.

The invention relates to the art of continuously or intermittently drawing glass in sheet or plate form from an elongated wedge like portion of plastic glass which is being drawn from a body of molten glass. My present invention consists in using one or more simplified implements or tools, which may be used by hand or automatically actuated means, for treating the margin or edge portion of the drawn plastic glass wedge at a point or points above the surface of the body of molten glass, whereby to either counteract the tendency of the edge of the wedge to recede toward the center of the sheet or stretch out the same when desired, thus maintaining the width of the sheet while producing sheet edges of predetermined form and reduced thickness. In my present invention I only treat the edge portion of the naturally drawn plastic glass wedge at a point spaced above the body of molten glass but below the upper thinner portion of the wedge. The desired result being attained in a simplified manner without in any way deforming or unduly cooling the body of molten glass from which the glass wedge is being drawn, thereby the sheet edges are not only maintained in line in reduced thickness, but are of good temper for subsequent treatment such as cutting with suitable ordinary cutting tool.

In the drawings which illustrate the preferred forms of embodiment and method of treating the margin or edge portion of the drawn wedge, Figs. 1 to 7, are fractional side and plan views of a suitable form of tank furnace containing the molten glass for drawing. Figs. 8 to 12, illustrate some preferred form of implements or tools which may be used for treating the margin of the drawn glass wedge. I may use a form of tank and drawing apparatus such as shown in my pending applications No. 211,266 filed Jan. 10, 1918, now Patent No. 1,692,585, dated Nov. 20, 1928 or No. 318,111 filed Aug. 18, 1919, now Patent No. 1,790,774, dated Feb. 3, 1931.

In the figures, 1 is the wall of the tank furnace containing a body of molten glass 2, the upper inner portion of the tank block may be cut away and rounded as at 3, or curved as at 4, in line with the width of the sheet glass 5 which is being drawn from the body of molten glass 2. In the tank wall is a restricted air pocket or channel 6 extending to a point adjacent the portion of molten glass 7 from which the edge of the drawn glass wedge 10 is being drawn. Pipe 8 with a controlling valve 9, is provided for supplying a temperature affecting medium into said pocket; gas may be used for heating and air for cooling, both being under pressure, so that the viscidity of the portion of glass 7 may be increased or decreased at will to induce anchorage of the glass drawn at such point and adjacent to the fixed refractory block of the tank wall. This anchorage creates a glass source from which the edge of the inverted drawn wedge takes form and is maintained in substantially constant position. In other words, the edges of the sheet are drawn from portions of the molten glass controlled as to viscosity and adjacent to fixed refractory walls to which the glass adheres so that the width of the drawn sheet is maintained substantially uniform throughout the drawing operation. As shown the means provided permit producing this temperature effect at or below the surface of the glass on such restricted or confined area as to obviate dispersion of the temperature affecting medium on the glass, and hence avoid tendency to produce abnormally thick glass in the edges, but readily induce anchorage to a degree of nicety due to the control of the temperature affecting medium, and its application through conduction through the refractory block on such restricted area.

The figures only show one side of the drawing forehearth, it will be clear that the opposite sides will be as that shown and described. The width of this forehearth or drawing tank may vary from 3 to 9 feet depending upon the size or width of the sheet to be drawn.

The above described channel or air pocket for the local control of temperature is shown and described in my pending application No. 211,266, filed Jan. 10, 1918, and for further detail reference may be had to said application.

Referring to Fig. 3, it will be seen that the faces of the drawn sheet (one side shown only) are trapezoidal in form. In Fig. 2 this initially drawn portion is somewhat in the form of an acute angle in cross section forming an inverted wedge like drawn blanc or body of plastic glass 10 somewhat rounded at the edges. The base of this wedge forms a parallelogram at the surface of the body of molten glass, and the summit or thin edge thereof corresponding in thickness to that of the finished sheet or plate glass being drawn. This thickness may vary from $\frac{1}{32}$ to $\frac{1}{4}$ inch in thickness more or less while the base may vary from 2 to 3 inches in thickness, the wedge extending upward from 4 to 8 inches depending upon the temperature of the glass and the speed of the drawing.

In my present method I preferably draw from a free body of molten glass, no refractory member or block being immersed in the glass bath adjacent the edges of the drawn glass nor along the side of the drawn sheet. The sheet or plate being drawn from an entirely free undisturbed mass of molten glass including the glass from which the edges are being drawn.

I provide an implement or tool having a handle 11, and having two extending arms inturned to form an incomplete annulus in the same plane with the handle 11, there being a space left between the ends of these arms as shown at 13, this space is greater than that of the cross section of the upper portion of the wedge, but it is less than that of the maximum thickness of the edge of the drawn glass wedge above the body of molten glass. The space between the projecting arms of the implement may be varied at will and determines the ultimate thickness of the edges of the drawn sheet. The method of operation consists in the step of freely introducing the tool on each side of the upper thinner portion of the wedge as shown by dotted lines 14 in Figs. 2 and 3, and then by a downward movement causing the ends of the arms to gradually engage the thicker portion of the drawn wedge of plastic glass as at 15 and slightly remote from the body of molten glass. This movement may be vertical or may follow the contour of the edge of the wedge as shown. The glass being forced or compressed toward the restricted temperature controlled area of the wall of the tank. The spaced apart members of the edging implement or tool may engage the margin and edge of the thickly drawn glass. In this manner the initially drawn wedge will be positively reduced into a secondary wedge of lesser thickness as it is drawn through and above the implement. Such secondary wedge of glass is then stretched to final thickness together with the final shaping of the sheet above said implement. If desired, however, the tool may be withdrawn upwardly, or the operator may pull the tool outwardly to disengage it from the glass, at the same time reducing the thickness of the edge of the wedge as shown by dotted line 16 in Fig. 1. This is accomplished without disturbing the body of molten glass beneath nor in stretching outwardly the drawn sheet above and also causes the drawn edges of the sheet to remain in line and to draw and take form in reduced thickness and good temper.

If desired the operator may use a tool having a greater restricted space 13, to cause the end of both arms to engage the lower portion of the wedge more deeply by a downward movement, and thereby produce a greater squeezing and pulling effect in outwardly freeing the tool insuring avoidance of recession of the base of said wedge for a longer period of time.

The downward squeezing or compressing movement upon the thick portion of the wedge is of importance in my present process, as this is the only portion that has a great tendency to recede from the drawing line, and my process or treatment is directed to such point.

The operator may regulate the time of one operation to impart sufficient slight cooling upon the engaged wedge portion by the non-adherent tool, so that, in withdrawing the tool from engagement, at the same time flattening the edge, he may bring said edge in adherent contact or in anchored relation at a point remote from the body of molten glass upon the adherent refractory wall of the tank as at 17 in Fig. 5, and as shown by dotted lines 17 in Figs. 4 and 7. My present invention is not limited to this form of procedure however, and space 13 may be so regulated, and so much time consumed in the operation (say from 8 to 15 or 20 seconds more or less) as to just allow for the squeezing of the edge of the wedge by the outward withdrawal of the tool with sufficient friction or resistance only to maintain the same in position.

With little practice and observation the operator will soon learn the proper time and speed for one treatment or manipulation, and how often such treatment must be repeated on each side of the sheet to obtain the best result in accordance with the present description. The greater the time consumed for one treatment the greater the cooling effect, and hence the following treatment may be delayed for a greater period of time (from 1 to 2 minutes more or less) however the operator must guard against too much cooling which would tend to produce thick edges in the sheet glass being drawn.

As shown in Fig. 3, portion of glass 7 may flow over the inclined surface of the tank wall where easy access may be had to the lower portion of the wedge with the tool. The edge of the wedge may be drawn from the glass at such point, but I prefer to maintain the level of the glass bath away from such surface as shown in Figs. 4, 5 and 7. When the edge of the wedge is outwardly anchored upon the inclined or vertical adherent surface of the refractory tank wall, it will assist greatly in the forming and maintaining the edges of the drawn glass in line. The convex surface 3 tends to produce thinner edges, while concave surface 4 tends to thicken the edge a little. Convex surface 3 aids greatly in the operation of forming the edge as well as to maintain the same in line.

I prefer to use a form of tool shown in Fig. 11, the end of both arms being rounded as shown. It will be understood that the more these arms are inturned the greater the grip they will have upon the wedge, the contrary will allow for easier slippage upon the glass when the tool is disengaged or withdrawn. The amount of slippage is also a factor in forming and maintaining the position of the edge of the wedge. I may use the form of tool shown in Fig. 12, which provides for the adjusting of space 13, pressure on handle 18 connected to rod 19 tending to close arm 12 pivoted on handle 11; spring 20 tends to force arms 12 apart.

Figs. 8 to 10, are modifications of tools somewhat horse shoe in form. 21 shows the arms arranged to form the space 13 dove tail in form, at 22 the arms are extended and spaced apart substantially parallel and will tend to flatten the border portion of the glass wedge extending betwen them, and at 23 the end of the arms are turned rearwardly. The end portion of these arms of preference are smooth or polished. The tools may be kept cool in any suitable way but it is not advisable to cool them to a too great extent, and at time they may be used in heated condition in such case wax, lime or the like may be applied upon them to prevent their sticking to the glass.

When the tools are used in a heated condition there will be little or no cooling of the glass, nevertheless the position of the edge may be maintained adjacent the temperature controlled wall of the tank or in portion of the glass 7. In this mode of procedure the edge of the drawn glass may be formed thinner and better tempered.

This application is a continuation in part of my pending application Serial No. 211,266, filed Jan. 10, 1918, now Patent No. 1,692,585, dated Nov. 20, 1928.

What I claim as new and desire to secure by Letters Patent, is:—

1. In the art of drawing sheet glass from a body of molten glass, the step that consists in intermittently engaging the edge portion of a drawn wedge of plastic glass above the body of molten glass by a squeezing tool, and imparting downward movement to such squeezing tool while the latter is engaged with the edge of the glass wedge.

2. In the art of drawing sheet glass from a body of molten glass, the step that consists in intermittently engaging the edge portion of a drawn wedge of plastic glass above the body of molten glass by a squeezing tool, and imparting a downward and outward movement to such squeezing tool while the latter is engaged with the edge of the glass wedge.

3. In the art of drawing sheet glass from a body of molten glass, the step that consists in intermittently engaging the edge portion of a drawn wedge of plastic glass above the body of molten glass by a non-adherent squeezing tool and imparting downward and outward movement to such squeezing tool while the tool is maintained in engagement with the wedge and at such a temperature as to have a cooling effect upon the squeezed portion of the glass.

4. In the art of drawing sheet glass from a body of molten glass, the step of forming and maintaining the sheet edge in line that comprises intermittently engaging the edge of a drawn glass wedge with a squeezing tool and by a downward and outward movement of the tool while in engagement with the glass causing the squeezed portion of the glass to adhere in anchored relation upon the surface of a temperature controlled refractory member adjacent to the edges of the drawn glass sheet.

5. The step of forming and maintaining the edge of a drawn glass sheet in line, comprising intermittently grasping and pulling the edge of a drawn wedge of glass outwardly and anchoring said pulled edge upon the adherent surface of a solid substance adjacent to said wedge.

6. In apparatus for drawing sheet glass, a tool of the character described comprising a handle having a pair of extended arms, said arms being inturned to provide a space between the ends thereof which is greater than the cross section of the upper portion of a drawn glass wedge from which a sheet glass is being drawn but which space is less in dimension than the lower cross section of said wedge whereby the lower portion of said drawn glass wedge may be engaged by a downward movement of said tool to form and maintain the edges of the drawn glass in position.

7. In apparatus for drawing glass sheet, a tool of the character described comprising a handle having a pair of arms at one end thereof, said arms forming an incomplete annulus with a restricted space between their end portions for engagement with a drawn glass wedge, said end portions being rounded in contour.

8. In apparatus for drawing glass sheet, a tool of the character described comprising a handle having a pair of arms inturned to provide a restricted space between the end portions thereof for engagement with a drawn glass wedge by a downward movement.

9. In apparatus for drawing glass sheet a tool of the character described comprising a handle having a pair of arms inturned to provide a restricted space between the end portions thereof for engagement with a drawn glass wedge by a downward movement, the end portions of said arms being so shaped or arranged that the space between them is in the form of a dovetail.

10. In the method of making sheet glass, the steps consisting in drawing a sheet of glass upwardly from the free surface of a molten bath, and frictionally engaging the edge portions only of the rising sheet by mechanical means and by a downward bodily movement of said means urging the same downwardly.

11. The method of forming sheet glass which consists in drawing a sheet of glass from a mass of molten glass, and stretching said sheet to counteract its narrowing tendency, the stretching force being applied to the border portions only of the rising sheet by mechanical means and by a downward bodily movement of said means urging the same downwardly.

12. In the method of making sheet glass, the steps consisting in drawing a sheet of glass upwardly from the free normal surface of a molten bath, and frictionally engaging the rising border portion only of the upwardly tapered meniscus of the sheet by mechanical means at a point intermediate the upper and lower portions thereof only and by a downward body movement of said means urging the same downwardly.

13. The method of drawing sheet glass from a molten bath which consists in forming the sheet by first drawing a free flaring wedge or meniscus above the surface of the bath, applying a force to the border portions only of the wedge by mechanical means, at points spaced above the bath but below the finished edges of the sheet, and urging the same downwardly.

14. In the method of making sheet glass, the steps consisting in drawing a free flaring wedge from a molten bath, drawing the sheet in finished form from the wedge, and frictionally engaging the opposite faces of the rising border portions only of the wedge by mechanical means at points intermediate the upper and lower portions thereof only and urging the same downwardly.

15. In the method of making sheet glass from a bath of molten glass in a container, the steps which consist in drawing a free flared wedge of glass from the bath, drawing the sheet from the wedge and anchoring the edge portions of the wedge adjacent the walls of the container at the same time applying a force to the rising border portions only of the flared wedge of glass by mechanical means and urging the same downwardly.

16. In the method of making sheet glass, the steps consisting in drawing a sheet of glass upwardly from a molten bath, and frictionally engaging the edge portions only of the rising sheet by mechanical means and by a downwardly bodily movement of said means urging the same downwardly and outwardly.

17. The method of forming sheet glass which consists in drawing a sheet of glass upwardly from a mass of molten glass and frictionally engaging the wedge forming the sheet by mechanical means at a point intermediate the upper and lower portions thereof only and urging the same downwardly and outwardly.

18. The method of forming sheet glass which consists in drawing a sheet of glass from a mass of molten glass, and stretching said sheet to counteract its narrowing tendency, the stretching force being applied by mechanical means in the same plane as said sheet and in a direction opposite to the drawing force, while at the same time maintaining said means against rotary movement at the points of contact to the glass.

19. In apparatus for drawing sheet glass, a tool of the character described comprising a handle having a pair of relatively fixed arms at one end thereof, said arms being curved away from each other intermediate their ends and forming an incomplete annulus with a restricted space between their end portions for engagement with a drawn glass wedge, said end portions being rounded in contour.

20. A method for producing sheet glass, which consists in drawing the sheet from an open bath and maintaining flaring glass wedges between the borders of the drawn sheet and the molten glass from which the sheet is drawn, applying a dragging force in opposition to the drawing force to said wedges while drawing said wedges upwardly through spaces in implements engaging the wedges only at the border portions of the forming sheet and at points wholly spaced above the bath but considerably below the upper portions of said wedges whereby said flaring wedges are only partly reduced for a substantial distance above the implements, freely stretching said wedges above said implements to further reduce said wedges in the final formation of the drawn border portions of the sheet, and at the same time maintaining the opposite glass engaging portions of said implements against rotating or relative movements while in engagement with the said flaring glass wedges of the sheet.

21. The method for producing sheet glass which consists in drawing the sheet from the free surface of an open bath of molten glass, in gathering and drawing a relatively thick upwardly tapering mass from the bath from which the sheet proper forms, applying a retarding dragging force upon the opposed sides of the rising border portions only of the upwardly tapering drawn mass by mechanical means and at points intermediate the upper and lower portions of the tapering drawn mass above the surface of the bath only, creating secondary upwardly tapering portions of glass of lesser thickness for a substantial distance directly above the points of engagement of said mechanical means with the glass and stretching the same to form the sheet border portions in final reduced thickness, at the same time maintaining said means against rotating movements when in contact with the glass to thereby secure the desired retarding drag and stretching action in the upwardly tapering border portions of the forming sheet.

22. In apparatus arranged for drawing sheet glass from a bath of molten glass by first forming an upwardly tapered thickly drawn portion of glass of predetermined thickness, a metallic edging implement adapted for engaging the border portion only of said upwardly tapered thickly drawn portion of glass, said implement having relatively fixed oppositely disposed members spaced apart sufficiently closely to each other to engage and partially reduce said upwardly tapered thickly drawn border portion at points wholly spaced above the bath, but sufficiently widely spaced from one another so that the partially reduced upwardly tapered border portions of the glass will be drawn for a considerable distance above the points of engagement of said implement with the forming glass.

23. In apparatus for drawing sheet glass, a tank for containing an open bath of molten glass from which to draw the sheet with the edge portions of the sheet taking form adjacent to the walls of the tank, means in the tank walls for anchoring the edge of the sheet adjacent the source thereof, and edging implements adapted for engaging the upwardly tapered thickly drawn border portions only of the glass, said implements having each a pair of oppositely disposed members spaced apart sufficiently closely to each other to engage and partially thin the thickly drawn border portions at points spaced above the bath and being sufficiently spaced from one another so that the partially reduced upwardly thickly tapered border portions of the glass will be drawn for a considerable distance above the points of engagement of said implements with the glass.

In testimony whereof, I affix my signature.

ARTHUR E. SPINASSE.